April 30, 1940.   A. F. WILLIAMS   2,198,852
EYEGLASSES
Filed Dec. 2, 1937
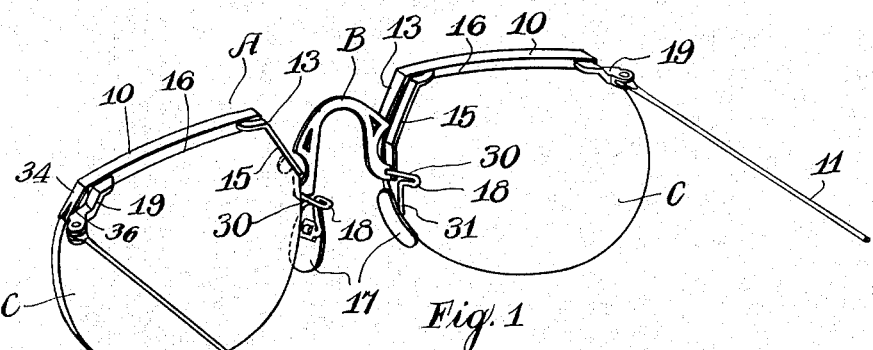
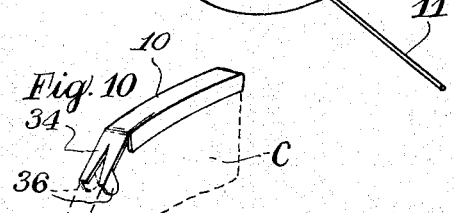
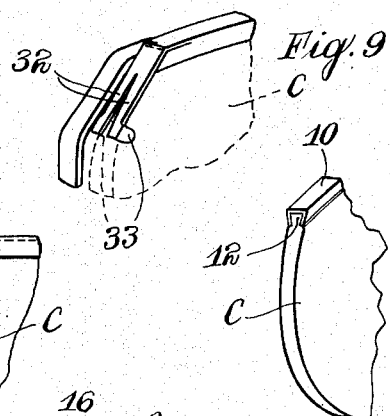
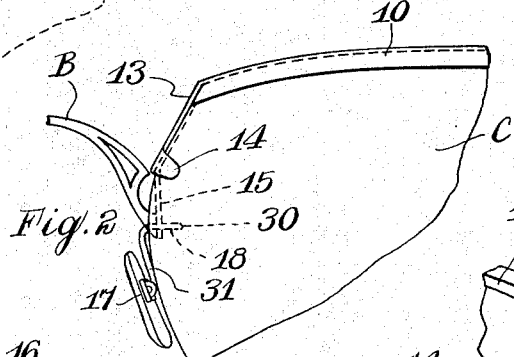
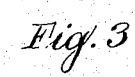
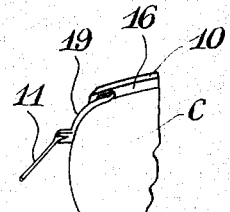
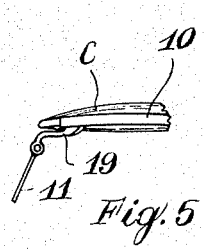
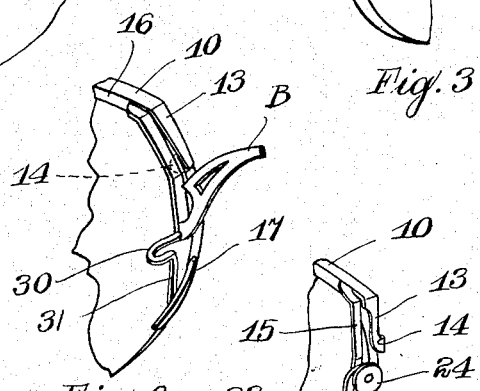
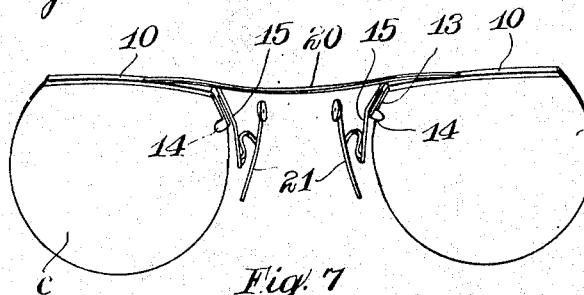
Arthur F. Williams
INVENTOR.
BY *[signature]*
ATTORNEYS.

Patented Apr. 30, 1940

2,198,852

UNITED STATES PATENT OFFICE 2,198,852

EYEGLASSES

Arthur F. Williams, St. Paul, Minn., assignor to Wils-Edge Corporation, St. Paul, Minn., a corporation of Minnesota Application December 2, 1937, Serial No. 177,719

6 Claims. (Cl. 88—47)

This invention relates to eyeglasses wherein the frame constitutes a channel-shaped member which engages the lens in properly formed arcuated grooves so that the lens is held firmly by the frame portion which extends only across a portion of the top of the lens. The lens may be formed with a dove-tailed groove and the channel of the frame shaped accordingly, or any other form of grooves designed to accommodate a supporting frame in a manner to engage the lens to hold the same firmly in place may be used.

A feature resides in providing eyeglasses or spectacles wherein no screws or holes are drilled into the lens, but the same are held by suitable grooves formed therein, and then the lens is slipped into a similarly shaped channel frame portion so as to support the lens from the top of the lens rather than from the sides.

A feature resides in providing an arm which extends down along the peripheral edge of the inner side of the lens formed as an integral part of the frame and provided with a small lip which engages against the front surface of the lens and acts to assist in bracing the same from the outside, acting as a stop on the peripheral edge of the lens and in conjunction with a long inner arm which supports the bridge piece and nose guards, tends to hold the lens against transverse movement. This holding means assists in supporting the lens along the peripheral edge of the inside of the same without drilling any holes in the lens and without impairing the full vision virtually through the entire lens.

Where the bows are supported to the top frame portions, a similar arm is integrally secured and extends down along the peripheral edge in back of the lens. The temple supporting arm is adjustable and is secured to the backside of the frame in a manner not to detract from the shape of the frame or change the contour of the top edge thereof.

A nose guard is provided on the long inner arm which is integrally connected to the inner face of the frame and which extends down along the peripheral edge of the lens, and this nose guard is of a peculiar structure, particularly adapted to support the lenses to the nose of the wearer without the bows. This guard is provided with a lower loop form from which extends upwardly a single arm in line with the inner surface of the elongated nose engaging loop and on the end of this arm is provided a disc-like pad. The arm may be adjusted in relation to the loop so as to engage in the soft portion of the skin above the loop while the loop rests upon the bridge of the nose bone. Thus the long arm which engages the cushion of the skin of the nose above the bridge bone is adjustable so as to firmly engage without injury, that cushion portion of the upper part of the nose virtually adjacent the eyebrows. This holds the eyeglasses from dropping forward at the top.

In the drawing forming a part of my specification:

Figure 1 is a perspective view of the eyeglasses with the bows secured to the bow supporting arms of the frame portions, looking toward the bridge from the inside of the lenses, showing a form of nose bridge supported by the long depending inner arms.

Figure 2 is an enlarged detail of the eyeglasses shown in Figure 1, looking toward the outside surface of the lens and bridge portion.

Figure 3 illustrates a detail of the lens and frame for supporting the same.

Figure 4 is a detail of a form of the arm for supporting the temple, showing the manner in which it is attached to the inside surface of the frame.

Figure 5 is a plan view of Figure 4.

Figure 6 illustrates a perspective detail of a portion of the frame and lens shown in Figure 1.

Figure 7 illustrates a pair of eyeglasses without the temple supporting arms.

Figure 8 is a detail of the nose guard, the long arm for supporting the same which is formed integral with the nose guard and which is attached to the inner side of the frame member, and showing the long lens bracing arm which extends along the periphery of the inner surface of the lens and which is formed with a lip which engages the outer surface of the lens.

Figure 9 is a perspective detail view of a slightly modified form of frame construction.

Figure 10 is a perspective detail view of the frame construction of Fig. 1.

The eyeglasses A are illustrated in Figure 1 with a bridge portion B which is simply illustrative of a form of bridge that may be used with the glasses. It is apparent that any form of bridge desired may be used with the eyeglasses A. The lenses C are illustrated in position as they would be supported by the frame portions 10 which extend only along the portion of the lens adjacent the eyebrow. A feature of these eyeglasses is that the frame channels 10 extend in alignment with the contour of the eyebrows. Thus a feature of the eyeglasses A is to provide a strong lens supporting means which does not require any holes to be formed in the lenses for supporting the bridge portion or the temple members 11. Thus the eyeglasses A give a lens with a full vision and without view obstructing holes or clasps on the lenses through any portion of the same which is used most frequently for vision.

The lenses C may be of any suitable form or shape and are grooved to provide a dove-tail-like flange portion which extends along the top portion only of the lens. This portion 12 fits into a similarly shaped channel formed by the channelled frame portions 10. The flange 12 may be cemented in the channel portions 10 of the eyeglasses A, which forms a cushion between the channel and the lens, or the end of the channel may be bent slightly to hold the lens from slipping out of the channel.

The channels 10 are provided on the inner ends with integral peripherally engaging arms 13 which engage against the inner edge of the lens C and which are provided on one side with a lip 14 which engages against the front face of the lens C. The arm 13 acts as a shoulder against which the inner peripheral edge of the lens C is held to form a stop and the lip 14 acts to brace the lens from moving transversely outward toward the front.

Long bridge supporting arms are integrally connected to the inner surface 16 of the frame portions 10. These arms 15 extend down along the peripheral marginal edge of the lenses C and act as a bracing arm oppositely disposed to the lip 14 so as to further hold the lenses C against transverse movement in the frame portions 10.

The bridge supporting arms 15 may be connected to a bridge such as B, and are adapted to support the nose rests 17 by the adjustable arms 18 which extend as an integral part of the arms 15. The arms 15 may be of a flat wire-like formation so as to form a long, thin, marginal surface engaging brace-like arm portion for the inner edge of the lenses C and also providing an adjustable supporting means for the nose rests and the bridge when of the form illustrated in Figures 1, 2 and 6.

The bows 11 are adapted to be supported by the wire-like arms 19 which are integrally attached to the inner surface or marginal edge 16 of the frame portions 10. The arms 19 extend from the back of the frame portions 10 and down along the marginal peripheral edge of the lens C. The arms 19 may be made as long as desired and provide an adjusting means for the temple members 11. Thus the arms 19 also are out of the line of vision used most frequently by the eye of the wearer of these eyeglasses.

When the eyeglasses are made in the form illustrated in Figures 7 and 8, where a spring bridge arm 20 is employed, the same may be made in any suitable form and shape and is adapted to extend and be secured to the frame portions 10 so as to become virtually integral therewith in a manner to space the same apart to properly position the lenses C in relation to each other. In these eyeglasses the channel frame portions 10 are identical to those heretofore described and they are provided with the inner shoulder arms having the lips 14. Figure 7 is a view taken looking from the outside of the lenses C.

In this form of the eyeglasses, the arms 15 are adapted to support the nose rests 21 which are formed integral with the arms 15. The nose rests 21 are formed with a lower elongated open pad portion 22 which engages against the bridge bone while an upwardly extended arm 23 is provided with a pad 24 which engages against the cushion or soft portion of the upper part of the nose adjacent the eyebrows. The arm 23 permits the pad 24 to be adjusted so as to properly engage the soft portion of the upper part of the nose with the desired tension to hold the lenses C from dropping forward at the top, and prevents pivoting of the eyeglasses on the nose. Thus the nose rests or guards 21 are supported adjustably by the arms 15 and are adjustable in themselves so that the pad 24 can be adjusted in relation to the nose rest portion 22 to hold the eyeglasses firmly to the nose in a most comfortable and satisfactory manner. With nose engaging members such as 21, the lenses may be held more comfortably to the nose without the temple members such as 11, and with the assurance that they will not pivot on the nose which would cause the upper part of the lenses to fall away from the eyebrows. Further, the form of the nose engaging members 21, together with the arms 15, provides a greater range of adjustment for different noses with these eyeglasses without interfering with the line of vision adjacent the nose which is so important to a person in the use of his eyesight.

The adjustable arms 18 form an important part of the present invention. In the formation of eyeglasses, it has been common practice to provide arms by which the nose rests 17 are supported. However, in former constructions, these arms have been downwardly extending arms terminating in a resilient loop to the end of which the nose rests are secured, or else in the form of loops secured directly to the frame to which the nose rests are attached.

It will be noted that in the drawing, the arms 18 are shown extending substantially transversely from the bridge or from the frame and form transversely extending loops 30. The end of these loops 30 form a downwardly extending arm portion 31 at the lower extremity of which the nose rests 17 are secured. The advantage of this construction lies in the adjustability of the nose rests. In fitting eyeglasses to the nose, it is usually necessary to space the nose rests closer together or farther apart to fit each individual nose. Previously this was done by either bending the loop or by bending the arm above the loop which of course changed the position of the loop and usually threw the loop out of alignment. If the loops themselves were bent to make the adjustment, it was difficult to bend both loops so that they were similarly shaped.

With my new construction the resilient loops are positioned substantially above the nose rests and are connected thereto by a bendable arm. The loops are formed to proper size and shape during the manufacturing process, and in adjusting the glasses to any nose, it is only necessary to bend the downwardly extending portions 31 of the arms 18. The size, shape, and direction of each loop 30 remains the same at all times, and all adjustment may be accomplished in the portion 31. This is extremely important as most of the time usually required for proper adjustment of the nose rests is obviated by the present construction.

In Figure 9 of the drawing, I disclose a slightly modified form of frame construction. In place of the arm 13 attached to the frame portions 10, I provide a split arm 32. At the end of each of the split portions of the arm 32, I provide a lip 33. One of these lips 33 is positioned on each side of the lens C. The splitting of the arm 32 enables the lips 33 to be spaced apart the required distance to accommodate the lens C therebetween. It will be understood that various lenses are of various thicknesses, and without providing a different width for each thickness of lens, it would be impossible to provide oppositely disposed lips 33 without some sort of adjusting mechanism. By merely splitting the arm 32 the split ends may be bent closer together or farther apart so that the lips 33 fit closely against opposed surfaces of the lens C.

In Figure 10 of the drawing, I illustrate a spring end member 34 attached to the frame 10. The end 34 is split as illustrated in Figure 9, and each split portion of the end is provided with a lip 36 which bears against one surface of the lens C. By spreading the split portion 34 more or less, the lips 36 are moved closer together or farther apart to accommodate any thickness of lens therebetween.

With the construction illustrated in Figure 10, the necessity for cementing the lenses in place may be avoided. The end 34 engages under spring tension against the surface of the lens to hold the same in position in the frame 10. By springing the end 34 upwardly, the lens C may be slidably removed from the channel frame 10. The end 34 may be formed of the same material as the frame 10 or may be of special resilient material attached to the frame 10.

In accordance with the patent statutes, the features and objects, together with the detail of the eyeglasses, have been defined to set forth the best embodiment thereof; however, these may be varied within the scope of the following claims.

I claim:

1. Glasses including a pair of lenses, frame portions having an arcuate formation extending adjacent a lens edge along the line of the eyebrow, integrally extending brace members at the nasal ends of said frame portions having lip means on the end thereof spaced from its respective frame portion for engaging the edge and one surface of said lenses to brace the same at a point spaced from the frame portion, and long, inner arm members supporting the nose rests and bridge integrally connected at the upper end to the inner surface of said frame portion and extending marginally along the lens edge adjacent the other lens surface opposite said lip to brace the inner surface of said lenses against transverse movement in cooperation with said lip means.

2. Glasses including eyebrow frame portions for supporting the lenses, integral edge engaging shoulder brace arms on the nasal ends of said frame portions, said arms including lip means at the free end thereof engageable with one lens surface, and long integral marginally extending nose rest and bridge arms secured to the nasal ends of said frame portions and overlying the other lens surface opposite said lip means to brace the lenses on the opposite side to said lip means.

3. Eyeglasses including eyebrow channel frame portions, peripheral shoulder arms with lens engaging lips engageable with one lens surface on the free ends thereof on the nasal ends of said frame portions, and long marginally extending thin arms secured to the nasal ends of said frame portions and engageable with the lens surface opposite said lips to integrally support nose engaging rests.

4. Glasses comprising spaced lenses, groove means along the upper marginal edges of said lenses, channel frame means adapted to slidably engage in said grooves to support said lenses, and spring means on said channel frame means engaging the periphery of a lens to hold said lens engaged in said channel frame means under spring tension.

5. Glasses including lenses, peripheral grooves in a marginal portion of each of said lenses, a channel frame engageable in said grooves to support said lenses, and spring means on said channel frame engageable with each of said lenses to hold the same engaged in said channel means under spring tension, said spring means including lips engageable on opposite sides of said lenses.

6. Glasses including a channel frame designed to engage a portion of each lens to support the lens, an arm secured to the end of said channel and overlying an adjacent portion of the lens edge, imperforate lip means at the end of said arm engageable against the outer surface of said lens at a point substantially spaced from said channel, and a second arm secured to the inner surface of said channel frame overlying a portion of the inner surface of the lense adjacent the edge thereof and opposite said lip.

ARTHUR F. WILLIAMS.